United States Patent [19]

Lahr

[11] 4,241,538
[45] Dec. 30, 1980

[54] DEVICE FOR AUTOMATICALLY WATERING PLANT CONTAINERS

[76] Inventor: Helmut Lahr, Gansmarkt 12, 65 Mainz-Bretzenheim, Fed. Rep. of Germany

[21] Appl. No.: 942,604

[22] Filed: Sep. 15, 1978

Related U.S. Application Data

[63] Continuation of Ser. No. 814,318, Jul. 11, 1977, abandoned.

[30] Foreign Application Priority Data

Jul. 17, 1976 [DE] Fed. Rep. of Germany ....... 2632347

[51] Int. Cl.³ .............................................. A01G 27/00
[52] U.S. Cl. .......................................... 47/79; 119/81; 137/408; 177/117; 251/9
[58] Field of Search ......................... 47/79; 251/9, 10; 119/81; 177/117; 137/408

[56] References Cited

U.S. PATENT DOCUMENTS

| 391,816 | 10/1888 | Packard | 251/9 X |
|---|---|---|---|
| 1,033,308 | 7/1912 | Fish | 251/10 X |
| 1,876,988 | 9/1932 | Lormor | 251/9 |
| 2,828,935 | 4/1958 | Ziegler et al. | 177/117 |
| 3,168,797 | 2/1965 | Patassy | 47/79 |

FOREIGN PATENT DOCUMENTS

| 612545 | 3/1956 | Fed. Rep. of Germany | 47/79 |
|---|---|---|---|
| 1206243 | 2/1960 | France | 251/9 |
| 604686 | 7/1948 | United Kingdom | 251/9 |
| 904991 | 9/1962 | United Kingdom | 251/9 |
| 1012565 | 12/1965 | United Kingdom | 251/9 |
| 148650 | 6/1961 | U.S.S.R. | 119/81 |

Primary Examiner—Steven A. Bratlie
Attorney, Agent, or Firm—Webb, Burden, Robinson & Webb

[57] ABSTRACT

A pair of lever arms are hinged together at one end and disposed beneath a plant container, compression spring being disposed between the other ends of said lever arms and a flexible water supply hose being sandwiched between said lever arms intermediate their ends. Thus, when the soil in the container is dry and thus light, the spring opens the arms and allows water to flow through the hose to the soil; when the soil is moist, and thus heavy, its weight overcomes the force of the spring and compresses the hose to cut off the supply of water.

1 Claim, 1 Drawing Figure

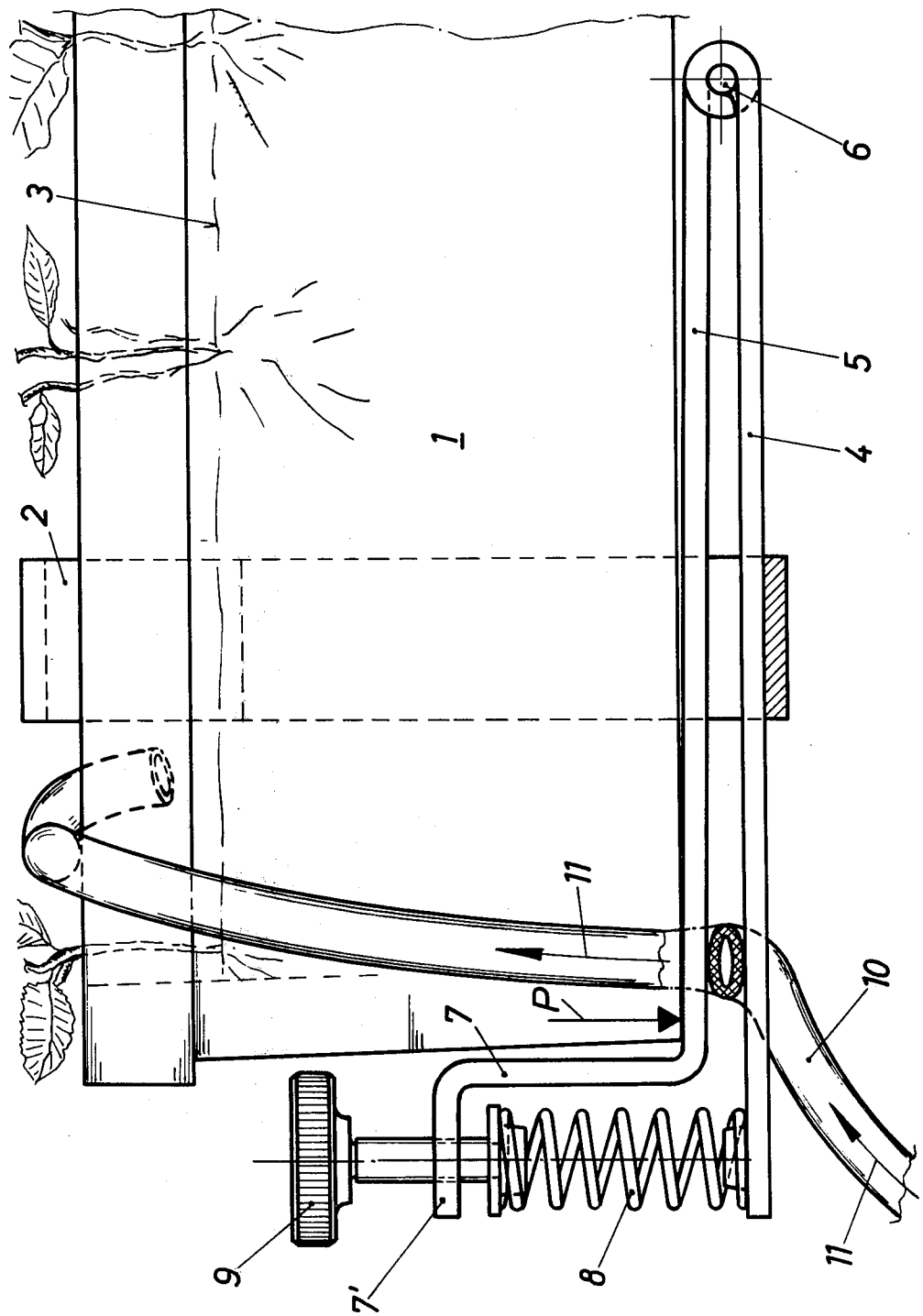

DEVICE FOR AUTOMATICALLY WATERING PLANT CONTAINERS

This is a continuation of application Ser. No. 814,318, filed July 11, 1977, now abandoned.

FIELD OF THE INVENTION

The invention relates to a device for the automatic watering of plant containers.

DISCUSSION OF PRIOR ART

The owner of balcony flower boxes, room flower pots and large pot plants must, as it is known, through regular replenishment of water ensure that the plant soil maintains the necessary moisture. This creates a particular problem when the plant lover is absent for a fairly long time from his dwelling for holiday or other reasons. Still no automatic simply-working watering system which undertakes an automatic and adequate feed of water is offered on the market. Prior apparatuses proposed are very expensive or complicated since the amounts of water needed depends on the size of the plant container, the water requirement of the plants and on the fluctuating air moisture. The use of an electronically-operated moisture sensor would in any case be too expensive and is unsuitable for a general use since plant lovers can often not deal properly with complicated apparatus.

OBJECT OF THE INVENTION

An object of the invention is to provide a simply constructed and easily-understandable apparatus for the automatic watering of plant containers which, as a result of its cheapness and simple handling, appears suitable for a very wide use.

BRIEF STATEMENT OF THE INVENTION

In accordance with the invention, a device for the automatic watering of plant containers comprising a pair of levers disposed beneath the plant container and which levers are loaded by the container and which are connected together at one end and between the free lever arm ends of which there is clamped a compression spring which is adjustable by means of an adjusting screw and which keeps the lever pair spread so wide that a flexible water supply hose inserted between the lever pair has, in the case of a lightweight i.e. dry plant container, an adequate free cross-section of passage for the water supply and which spring, in the case of a heavy i.e. wet plant container, allows a complete squeezing-together of the water supply hose.

BRIEF DESCRIPTION OF THE DRAWING

The drawing shows a portion of a conventional balcony flower box in side view.

DESCRIPTION OF A PREFERRED EMBODIMENT

A preferred embodiment of apparatus of the invention is used in conjunction with a balcony blower box 1 suspended to the end by a suspension hook 2.

Inserted between the suspension hook 2 and the balcony flower box 1 is a pair of levers 4,5, which are connected together at one end by a hinge 6.

Clamped between the two free ends of the levers is a compression spring 8 with an adjusting screw 9. For this purpose, it is advisable to bend the one free end of the lever 5 aside twice at a right angle in the sense shown in the drawing, so that the lever portions 7 and 7' arise.

Inserted between the lever pair 4,5 is a flexible water supply hose 10, which is intended for feed of water in the direction of arrow 11.

The installation of the described device is absolutely simple: With dry soil 3 of the balcony flower box 1, the lever pair 4, 5 is inserted and the adjusting screw 9 regulated in such a way that the flexible water hose 10 is squeezed together only to such an extent that an adequate free cross-section of passage for a small water feed remains open. After a specific time of the water feeding, the initially dry soil 3 is moistened and has increased considerably in weight. The weight loading P exerted on the hose 10 by the heavy damp soil 3 increases and narrows continuously the free cross-section of passage of the water supply hose 10 until the water supply hose is completely squeezed together. When, after a certain time, the moist heavy soil 3 has evaporated its absorbed water, the soil 3 becomes lighter and the compression spring 8 opens the levers slightly and there arises afresh a free cross-section of passage in the water supply hose 10, so that the cycle can begin anew.

In the case of particularly heavy plant containers the container is not disposed in the immediate vicinity of the compression spring 8 on the lever pair 4, 5 but, to reduce the lever arm length nearer to the hinge 6.

The water feed itself can be effected with the aid of a filled water container which is arranged at a certain level when it is a question of smaller plant containers which have to be automatically moistened only for a short time. However, the possibility also exists of tapping the normal drinking-water supply by way of a suitable pressure limitation valve.

Of course, the possibility also exists of serving simultaneously several plant containers with a single such device when a common water supply hose 10 connects these several plant containers together.

I claim:

1. A watering device for a plant container consisting of upper and lower lever arms in substantially parallel relationship joined at an end by a hinge, said lower arm being fixed;
    a plant container positioned on a major portion of the upper lever arm;
    an adjustable compression spring arranged between the lever arms near their ends opposite their hinged ends, the spring engaging said lower arm and the lower portion of an adjusting screw urging the lever arms in opposite angular directions;
    said adjusting screw located beside the container and having an upper control portion which extends above said upper lever arm, and a connecting portion which passes through and threadably engages the upper lever arm and connects with said lower portion to increase or decrease the compression on the spring;
    a flexible hose extending transversely between the lever arms and having an end communicating with the plant container such that a fluid flowing through the hose will be deposited in the container;
    whereby fluid flows through the hose to fill the container to a predetermined weight at which time the combined weight of the fluid, container, and upper lever arm compress the spring and drives the two lever arms together to pinch the hose thereby stopping or reducing the flow of fluid therethrough and whereby adjustment of the screw permits the adaption of the watering device to plant containers of different weights.

* * * * *